(12) United States Patent
Abdelghaffar et al.

(10) Patent No.: US 12,627,438 B2
(45) Date of Patent: May 12, 2026

(54) MAPPING REFERENCE SIGNAL RESOURCES TO VIRTUAL PANELS

(71) Applicant: QUALCOMM Incorporated, San Diego, CA (US)

(72) Inventors: Muhammad Sayed Khairy Abdelghaffar, San Jose, CA (US); Yan Zhou, San Diego, CA (US); Wooseok Nam, San Diego, CA (US); Mostafa Khoshnevisan, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 18/006,546

(22) PCT Filed: Sep. 7, 2020

(86) PCT No.: PCT/CN2020/113715
§ 371 (c)(1),
(2) Date: Jan. 23, 2023

(87) PCT Pub. No.: WO2022/047773
PCT Pub. Date: Mar. 10, 2022

(65) Prior Publication Data
US 2023/0299915 A1    Sep. 21, 2023

(51) Int. Cl.
*H04L 5/00* (2006.01)
*H04L 5/14* (2006.01)
*H04W 16/28* (2009.01)
(52) U.S. Cl.
CPC .......... *H04L 5/0051* (2013.01); *H04L 5/1469* (2013.01); *H04W 16/28* (2013.01)

(58) Field of Classification Search
CPC .... H04L 5/0051; H04L 5/1469; H04W 16/28; H04B 7/0404; H04B 7/0691; H04B 7/061; H04B 7/063
See application file for complete search history.

(56) References Cited

U.S. PATENT DOCUMENTS 8,086,272 B2 * 12/2011 Teo ........................ H04B 7/061
455/562.1
12,143,186 B2 * 11/2024 Zhang ................. H04W 52/365
(Continued)

FOREIGN PATENT DOCUMENTS

CN        111164905 A        5/2020
CN        111405663 A        7/2020
(Continued)

OTHER PUBLICATIONS

Huawei, et al., "Discussion on Panel ID and Usage", 3GPP TSG RAN WG1 Meeting #97, R1-1907553, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, XP051728986, 5 Pages.

(Continued)

*Primary Examiner* — Sai Aung
*Assistant Examiner* — Wilfred Thomas
(74) *Attorney, Agent, or Firm* — Harrity & Harrity, LLP \ Qualcomm

(57)        ABSTRACT

Various aspects of the present disclosure generally relate to wireless communication. In some aspects, a user equipment (UE) may determine a plurality of virtual antenna panels, wherein the plurality of virtual antenna panels correspond to a plurality of groups of antenna ports and map to one or more portions of at least one physical antenna panel. The UE may map a plurality of reference signal resources to the plurality of virtual antenna panels. The UE may transmit, to a base (Continued)

600 ——▶ station and based at least in part on the mapping, reference signals using the plurality of reference signal resources. Numerous other aspects are provided.

20 Claims, 11 Drawing Sheets

(56)                    References Cited

U.S. PATENT DOCUMENTS

| | | | |
|---|---|---|---|
| 2015/0009870 A1* | 1/2015 | Bashar | H04L 5/0016 370/280 |
| 2018/0191407 A1* | 7/2018 | Zhang | H04B 7/0456 |
| 2019/0103949 A1* | 4/2019 | Harrison | H04B 7/0456 |
| 2019/0334592 A1* | 10/2019 | Han | H04B 7/0417 |
| 2020/0204316 A1* | 6/2020 | Zhang | H04B 7/0695 |
| 2020/0235802 A1* | 7/2020 | Nilsson | H04L 25/0226 |
| 2020/0266875 A1 | 8/2020 | Zhou et al. | |
| 2020/0383089 A1* | 12/2020 | Goto | H04L 1/1822 |
| 2022/0053483 A1* | 2/2022 | Yoshioka | H04W 72/1268 |
| 2022/0070855 A1* | 3/2022 | Zhang | H04W 72/51 |
| 2022/0103223 A1* | 3/2022 | Zhao | H04B 7/0695 |
| 2022/0239352 A1* | 7/2022 | Hakola | H04B 7/088 |
| 2022/0286868 A1* | 9/2022 | Kim | H04W 24/08 |
| 2023/0044880 A1* | 2/2023 | Cao | H04W 16/28 |
| 2023/0049502 A1* | 2/2023 | Petersson | H04B 7/0404 |
| 2023/0132757 A1* | 5/2023 | Kang | H04B 7/08 370/329 |
| 2023/0142007 A1* | 5/2023 | Matsumura | H04B 7/0874 375/262 |
| 2023/0155657 A1* | 5/2023 | Zhang | H04W 52/365 455/101 |
| 2023/0208589 A1* | 6/2023 | Li | H04B 7/0695 370/329 |
| 2023/0246690 A1* | 8/2023 | Khoshnevisan | H04B 7/0691 375/267 |
| 2023/0283430 A1* | 9/2023 | Zhu | H04B 7/0404 370/329 |

FOREIGN PATENT DOCUMENTS

| | | |
|---|---|---|
| WO | 2020112336 A1 | 6/2020 |
| WO | 2020168246 A1 | 8/2020 |

OTHER PUBLICATIONS

Huawei, et al., "Enhancements on Multi-Beam Operation in Rel-17", 3GPP TSG RAN WG1 Meeting #102-e, R1-2005246, 3rd Generation Partnership Project, Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 8, 2020, 16 Pages, XP051917294, Sections 3 and 4.
Supplementary European Search Report—EP20952017—Search Authority—Munich—May 10, 2024.
International Search Report and Written Opinion—PCT/CN2020/113715—ISA/EPO—Jun. 3, 2021.

* cited by examiner

300

600

SRS #1

GUARD

SRS #2

Guard (panel activation)

SRS #3

GUARD

SRS #4

650

810 — Transmit, to a user equipment (UE), a plurality of reference signal resources 820 — Receive, from the UE, an indication of a plurality of virtual antenna panels 830 — Receive, from the UE and based at least in part on the plurality of virtual antenna panels, reference signals using the plurality of reference signal resources

800

MAPPING REFERENCE SIGNAL RESOURCES TO VIRTUAL PANELS

CROSS-REFERENCE TO RELATED APPLICATION

This application is a 35 U.S.C. 371 national stage application of International Patent Application No. PCT/CN2020/113715, filed on Sep. 7, 2020, entitled "MAPPING REFERENCE SIGNAL RESOURCES TO VIRTUAL PANELS," which is expressly incorporated by reference herein.

FIELD OF THE DISCLOSURE

Aspects of the present disclosure generally relate to wireless communication and to techniques and apparatuses for mapping reference signal resources to virtual panels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a plurality of virtual antenna panels, wherein the plurality of virtual antenna panels correspond to a plurality of groups of antenna ports and map to one or more portions of at least one physical antenna panel; mapping a plurality of reference signal resources to the plurality of virtual antenna panels; and transmitting, to a base station and based at least in part on the mapping, reference signals using the plurality of reference signal resources.

In some aspects, a method of wireless communication performed by a base station includes transmitting, to a UE, an indication of a plurality of reference signal resources; receiving, from the UE, an indication of a plurality of virtual antenna panels, wherein the plurality of virtual antenna panels correspond to a plurality of groups of antenna ports and map to one or more portions of at least one physical antenna panel; and receiving, from the UE and based at least in part on the plurality of virtual antenna panels, reference signals using the plurality of reference signal resources.

In some aspects, a UE for wireless communication includes a memory and one or more processors coupled with the memory, the memory and the one or more processors configured to determine a plurality of virtual antenna panels, wherein the plurality of virtual antenna panels correspond to a plurality of groups of antenna ports and map to one or more portions of at least one physical antenna panel; map a plurality of reference signal resources to the plurality of virtual antenna panels; and transmit, to a base station and based at least in part on the mapping, reference signals using the plurality of reference signal resources.

In some aspects, a base station for wireless communication includes a memory and one or more processors coupled with the memory, the memory and the one or more processors configured to transmit, to a UE, an indication of a plurality of reference signal resources; receive, from the UE, an indication of a plurality of virtual antenna panels, wherein the plurality of virtual antenna panels correspond to a plurality of groups of antenna ports and map to one or more portions of at least one physical antenna panel; and receive, from the UE and based at least in part on the plurality of virtual antenna panels, reference signals using the plurality of reference signal resources.

In some aspects, a non-transitory computer-readable medium storing a set of instructions for wireless communication includes one or more instructions that, when executed by one or more processors of a UE, cause the UE to determine a plurality of virtual antenna panels, wherein the plurality of virtual antenna panels correspond to a plurality of groups of antenna ports and map to one or more portions of at least one physical antenna panel; map a plurality of reference signal resources to the plurality of virtual antenna panels; and transmit, to a base station and based at least in part on the mapping, reference signals using the plurality of reference signal resources.

In some aspects, a non-transitory computer-readable medium storing a set of instructions for wireless communication includes one or more instructions that, when executed by one or more processors of a base station, cause the base station to transmit, to a UE, an indication of a plurality of reference signal resources; receive, from the UE, an indication of a plurality of virtual antenna panels, wherein the plurality of virtual antenna panels correspond to a plurality of groups of antenna ports and map to one or more portions of at least one physical antenna panel; and receive, from the UE and based at least in part on the plurality of virtual antenna panels, reference signals using the plurality of reference signal resources.

In some aspects, an apparatus for wireless communication includes means for determining a plurality of virtual antenna panels, wherein the plurality of virtual antenna panels correspond to a plurality of groups of antenna ports and map to one or more portions of at least one physical antenna panel; means for mapping a plurality of reference signal resources to the plurality of virtual antenna panels; and means for transmitting, to a base station and based at least in part on the mapping, reference signals using the plurality of reference signal resources.

In some aspects, an apparatus for wireless communication includes means for transmitting, to a UE, an indication of a plurality of reference signal resources; means for receiving, from the UE, an indication of a plurality of virtual antenna panels, wherein the plurality of virtual antenna panels correspond to a plurality of groups of antenna ports and map to one or more portions of at least one physical antenna panel; and means for receiving, from the UE and based at least in part on the plurality of virtual antenna panels, reference signals using the plurality of reference signal resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
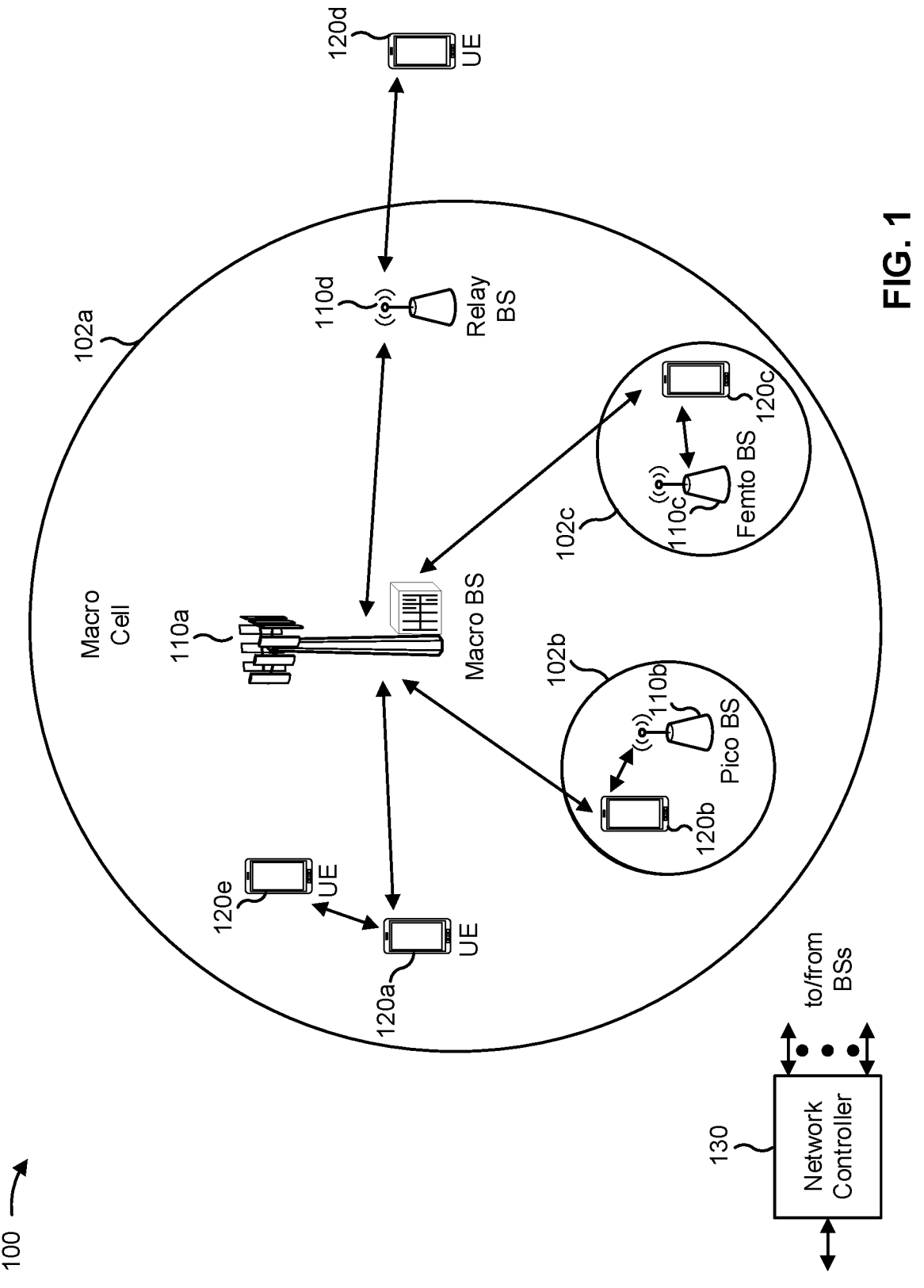
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
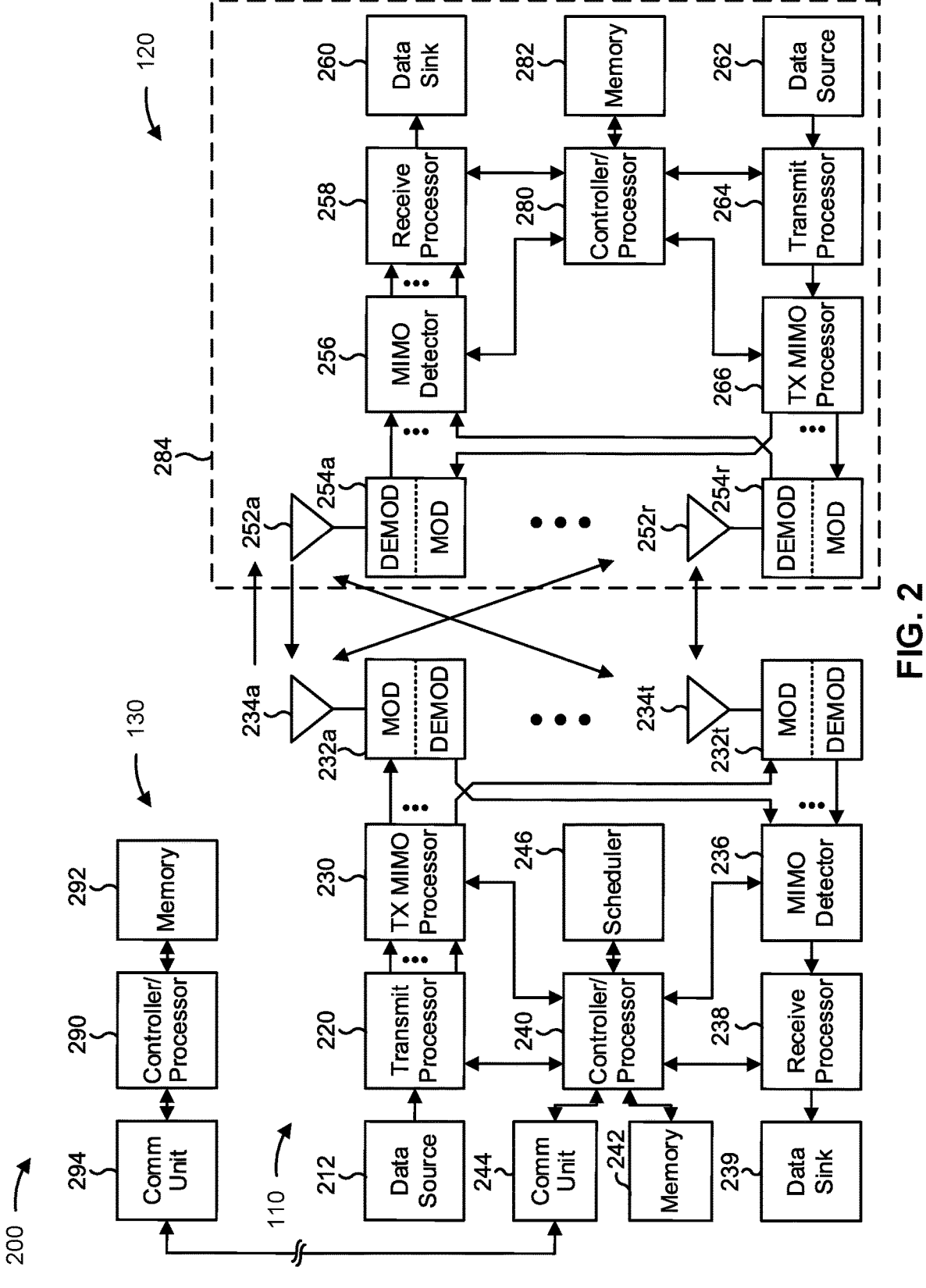
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-6B.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-6B.

Controller/processor 240 of base station 110, controller/ processor 280 of UE 120, and/or any other component(s) of FIG. 2 may perform one or more techniques associated with mapping reference signal resources to virtual panels, as described in more detail elsewhere herein. For example, controller/processor 240 of base station 110, controller/ processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like.

In some aspects, a UE (e.g., UE 120 and/or apparatus 900 of FIG. 9) may include means for determining a plurality of virtual antenna panels, wherein the plurality of virtual antenna panels correspond to a plurality of groups of antenna ports and map to one or more portions of at least one physical antenna panel; means for mapping a plurality of reference signal resources to the plurality of virtual antenna panels; and/or means for transmitting, to a base station (e.g., base station 110 and/or apparatus 1000 of FIG. 10) and based at least in part on the mapping, reference signals using the plurality of reference signal resources. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282. In some aspects, the UE may further include means for applying a same spatial-domain transmission filter when transmitting on the plurality of reference signal resources.

In some aspects, the UE may further include means for transmitting, to the base station, two or more gap times based at least in part on power statuses of the plurality of virtual antenna panels and means for receiving, from the base station and based at least in part on the two or more gap times, two or more time-domain resources configurations corresponding to each of the plurality of reference signal resources.

Additionally, or alternatively, the UE may include means for transmitting, to the base station, information indicating the power statuses of the plurality of virtual antenna panels. As an alternative, the UE may include means for receiving, from the base station, instructions to reconfigure the power statuses of the plurality of virtual antenna panels.

In some aspects, a base station (e.g., base station 110 and/or apparatus 1000 of FIG. 10) may include means for transmitting, to a UE (e.g., UE 120 and/or apparatus 900 of FIG. 9), an indication of a plurality of reference signal resources; means for receiving, from the UE, an indication of a plurality of virtual antenna panels, wherein the plurality of virtual antenna panels correspond to a plurality of groups of antenna ports and map to one or more portions of at least one physical antenna panel; and/or means for receiving, from the UE and based at least in part on the plurality of virtual antenna panels, reference signals using the plurality of reference signal resources. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the base station may further include means for transmitting, to the UE, a spatial-domain transmission filter to use on the plurality of reference signal resources.

In some aspects, the base station may further include means for receiving, from the UE, two or more gap times based at least in part on power statuses of the plurality of virtual antenna panels and means for transmitting, to the UE and based at least in part on the two or more gap times, two or more time-domain resources configurations corresponding to each of the plurality of reference signal resources.

Additionally, or alternatively, the base station may include means for receiving, from the UE, information indicating the power statuses of the plurality of virtual antenna panels. As an alternative, the base station may include means for transmitting, to the UE, instructions to reconfigure the power statuses of the plurality of virtual antenna panels.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
FIG. 3 is a diagram illustrating an example of antenna ports, in accordance with various aspects of the present disclosure.

FIG. 3 is a diagram illustrating an example 300 of antenna ports, in accordance with various aspects of the present disclosure. As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas, and the UE 120 may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a precoder may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+ j*h4. In this case, antenna port 3 can be represented as the sum of antenna port 1 and antenna port 2 (e.g., AP3=AP1+ AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 3 is provided merely as an example. Other examples may differ from what is described with regard to FIG. 3.

Figure 4:
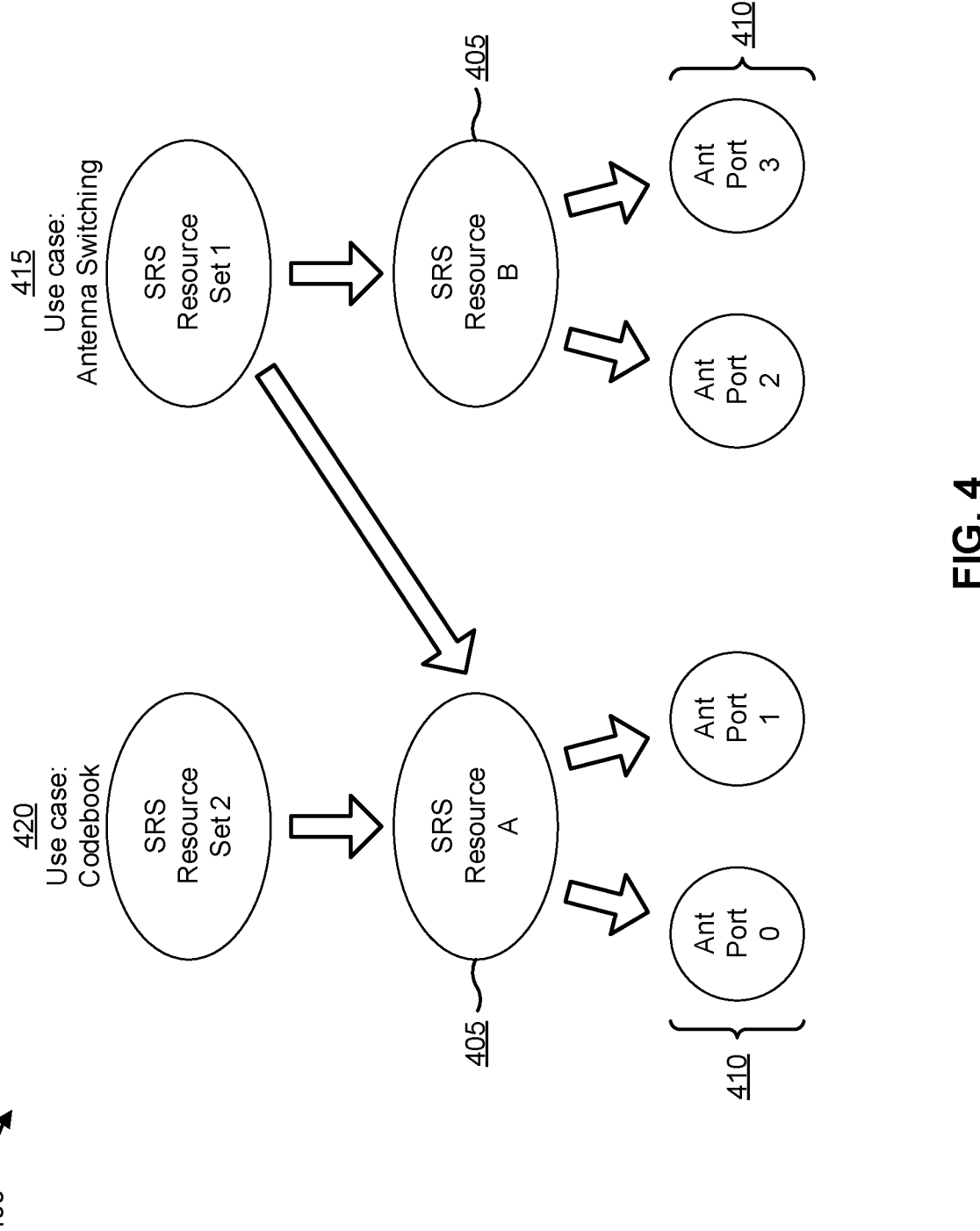
FIG. 4 is a diagram illustrating an example of sounding reference signal (SRS) resource sets, in accordance with various aspects of the present disclosure.

FIG. 4 is a diagram illustrating an example 400 of sounding reference signal (SRS) resource sets, in accordance with various aspects of the present disclosure. A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message, an RRC reconfiguration message, and/or the like). As shown by reference number 405, an SRS resource set may include one or more resources (e.g., shown as SRS resources), which may include time resources and/or frequency resources (e.g., a slot, a symbol, a resource block, a periodicity for the time resources, and/or the like).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, beam management, and/or the like.

An antenna switching SRS resource set may be used to indicate a downlink channel state indication (CSI) with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire the downlink CSI (e.g., to determine a downlink precoder to be used to communicate with the UE 120).

A codebook SRS resource set may be used to indicate an uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire the uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate the uplink CSI when the UE 120 selects an uplink precoder (e.g., instead of the base station 110 indicated an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire the uplink CSI. In this case, the non-codebook SRS may be precoded using a precoder selected by the UE 120 (e.g., which may be indicated to the base station 110). A beam management SRS resource set may be used for indicating a CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and the semi-persistent SRS resource may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 4, in some aspects, different SRS resource sets indicated to the UE 120 (e.g., having different use cases) may overlap (e.g., in time, in frequency, and/or the like, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

In some situations, a UE may use antenna switching for more than four antennas. For example, the UE may allow for 1T6R (one transmit chain and six reception chains), 2T6R, 4T6R, or other configurations with more than four reception chains. Accordingly, the UE may include multiple antenna panels, where each panel includes a plurality of antenna elements. For example, the UE may include three panels, where each panel has N antenna elements (e.g., cross-polarized elements and/or other similar antenna elements).

In order to obtain downlink CSI, the UE should transmit SRS across antenna ports of the panels. However, the UE may not want to explicitly indicate how many antenna panels are included in the UE to a base station. Moreover, the UE will use additional time during antenna switching when a target antenna panel is idle (or otherwise not fully powered) as compared with when the target antenna panel is active. Accordingly, the base station will not measure the correct SRS resources in the time domain when the UE 120 requires a longer gap time between transmissions.

Techniques and apparatuses described herein allow a UE (e.g., UE 120) to map physical antenna panels to virtual antenna panels. Accordingly, the UE 120 may communicate with a base station (e.g., base station 110) to configure SRS transmission without explicitly indicating how many antenna panels are included in the UE 120. Moreover, the base station 110 may configure different gap times across the SRS resource set to allow the UE 120 to perform antenna switching when one or more target antenna panels is idle (or otherwise not fully powered). Accordingly, the base station 110 may measure the correct SRS resources in the time domain when the UE 120 requires a longer gap time between transmissions.

As indicated above, FIG. 4 is provided as an example. Other examples may differ from what is described with regard to FIG. 4.

Figure 5:
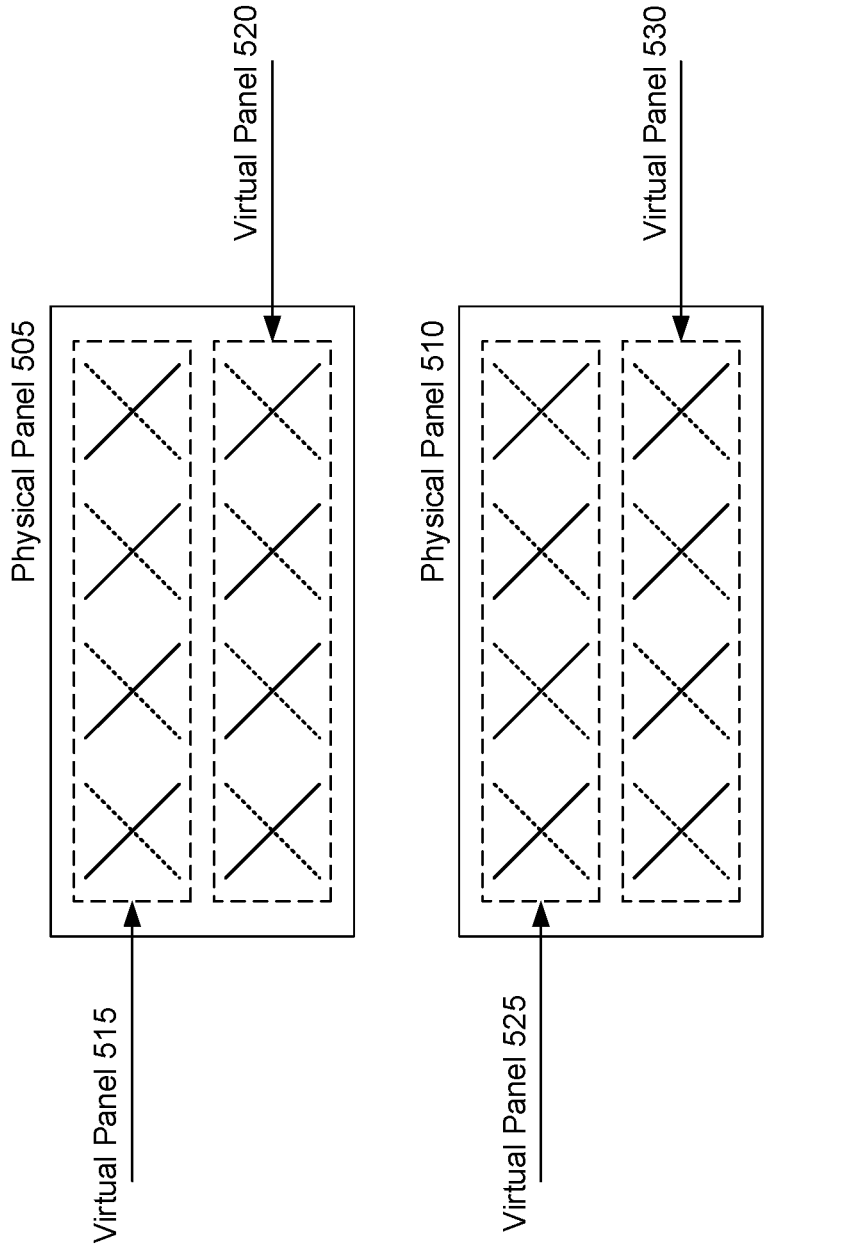
FIG. 5 is a diagram illustrating an example associated with virtual antenna panels, in accordance with various aspects of the present disclosure.

FIG. 5 is a diagram illustrating an example 500 associated with virtual antenna panels, in accordance with various aspects of the present disclosure. As shown in FIG. 5, example 500 includes a UE (e.g., UE 120) with at least two physical antenna panels (e.g., physical panel 505, physical panel 510, and/or other physical panels). Although the description below will focus on the UE 120 having two physical antenna panels, the description equally applies to the UE 120 having one physical antenna panel or additional physical antenna panels (e.g., three panels, four panels, or so on).

As further shown in FIG. 5, the UE 120 may determine a plurality of virtual antenna panels (e.g., virtual panel 515, virtual panel 520, virtual panel 525, virtual panel 530, and/or other virtual panels) that correspond to a plurality of groups of antenna ports (e.g., as described above in connection with FIG. 3) and map to one or more portions of at least one physical antenna panel (e.g., physical panel 505, physical panel 510, and/or other physical panels). In example 500, virtual panel 515 includes a first group of antenna ports on physical panel 505, and virtual panel 520 includes a second group of antenna ports on physical panel 505. Similarly, virtual panel 525 includes a first group of antenna ports on physical panel 510, and virtual panel 530 includes a second group of antenna ports on physical panel 510. Although the description below will focus on virtual panels that include portions of physical panels, the description equally applies to virtual panels that include multiple physical panels (e.g., one virtual panel include all or part of physical panel 505 and/or all or part of physical panel 510) and/or to virtual panels that include full physical panels (e.g., one virtual panel that maps to physical panel 505 and/or one virtual panel that maps to physical panel 510).

In some aspects, the groups of antenna ports are configured for simultaneous reception and are not configured for simultaneous transmission. For example, the UE 120 in example 500 may be configured for 1T4R such that the antenna port groups included in virtual panel 515, virtual panel 520, virtual panel 525, and virtual panel 530 may all receive simultaneously but may only transmit individually. Accordingly, reference signals in a reference signal resource set (e.g., SRSs in an SRS resource set as described above in connection with FIG. 4) may be time duplexed across the virtual panels.

In some aspects, the UE 120 may transmit, and the base station 110 may receive, an indication of the plurality of virtual antenna panels. For example, the UE 120 may transmit (e.g., using RRC signaling or other similar signaling) a UE capability message (e.g., as defined in 3GPP specifications or other technical standards), or other similar message, to the base station 110. The UE capability message may indicate a number of virtual antenna panels included in the UE 120.

In some aspects, the base station 110 may transmit, and the UE 120 may receive, an indication of a plurality of reference signal resources. For example, the base station 110 may indicate an SRS resource set, as described above in connection with FIG. 4. Accordingly, the UE 120 may map the plurality of reference signal resources to the plurality of virtual antenna panels. In some aspects, the UE 120 may explicitly associate each resource (e.g., each SRS resource) to a corresponding virtual panel. As an alternative, the UE 120 may associate each resource (e.g., each SRS resource) to a corresponding group of antenna ports such that the resource is implicitly mapped to the virtual panel including that group of antenna ports.

In some aspects, the base station 110 may transmit, and the UE 120 may receive, a spatial-domain transmission filter to use on the plurality of reference signal resources. For example, the base station 110 may transmit a transmission configuration indicator (TCI) state (e.g., as defined in 3GPP specifications or other technical standards), or other similar data structure defining a spatial filter, to the UE 120. Accordingly, the UE 120 may apply the spatial-domain transmission filter when transmitting on the plurality of reference signal resources. In some aspects, the UE 120 may apply the same spatial-domain transmission filter across the plurality of reference signal resources (e.g., across all SRS resources of the SRS resource set).

The UE 120 may transmit, to a base station and based at least in part on the mapping, reference signals using the plurality of reference signal resources. For example, the UE 120 may transmit SRSs using the groups of antenna ports included in the virtual antenna panels (e.g., virtual panel 515, virtual panel 520, virtual panel 525, virtual panel 530, and/or other virtual panels). In some aspects, as described below in connection with FIGS. 6A and 6B, the SRSs may be time duplexed (e.g., time division multiplexed (TDM) or otherwise divided in time).

By using the technique described in connection with FIG. 5, the UE 120 may coordinate with the base station 110 to perform antenna switching when transmitting SRSs without revealing, to the base station 110, a number of physical antenna panels included in the UE 120. Additionally, the UE 120 may group antenna ports that can perform simultaneous transmission into a single virtual panel regardless of whether those ports are included in a same physical panel. Accordingly, when the UE 120 includes a capability for multiple active antenna panels, the UE 120 may configure groups of antenna ports for higher-quality transmission and communication than if the UE 120 were only to use physical antenna panels to group antenna ports.

As indicated above, FIG. 5 is provided as an example. Other examples may differ from what is described with respect to FIG. 5.

Figure 6A:
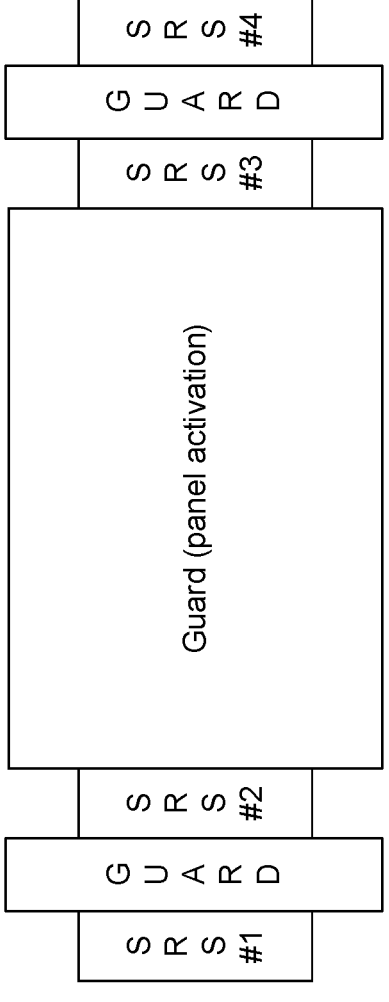
FIGS. 6A and 6B are diagrams illustrating examples associated with flexible gap time between reference signal resources, in accordance with various aspects of the present disclosure.
Figure 6B:
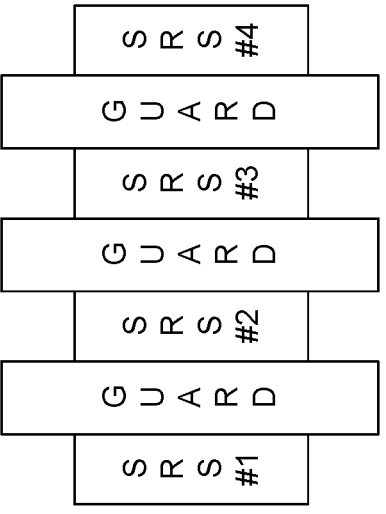

FIGS. 6A and 6B are diagrams illustrating examples 600 and 650, respectively, associated with flexible gap time between reference signal resources, in accordance with various aspects of the present disclosure. As shown in FIG. 6A, example 600 includes an SRS resource set with four SRS signals. Similarly, as shown in FIG. 6B, example 650 includes an SRS resource set with four SRS signals. Although the description below will focus on a UE (e.g., UE 120) transmitting four SRS signals, the description equally applies to the UE 120 transmitting fewer SRS signals (e.g., three signals, two signals, or so on) or additional SRS signals (e.g., five signals, six signals, or so on).

In some aspects, as described above in connection with FIG. 5, the UE 120 may map a plurality of reference signal resources (e.g., SRS resources from an SRS resource set) to a plurality of virtual antenna panels. Additionally, as shown in FIG. 6A, the UE 120 may time duplex (e.g., TDM or otherwise divide in time) reference signals (e.g., SRS signals as shown in FIG. 6A) that are transmitted on the plurality of reference signal resources.

In some aspects, as further shown in FIG. 6A, one or more gap times within the time duplexing may be based at least in part on a power status of a target one of the plurality of virtual antenna panels. In example 600, SRS #1 and SRS #2 may be assigned to virtual antenna panels that are active, while SRS #3 and SRS #4 may be assigned to virtual antenna panels that are idle or otherwise not fully powered. Accordingly, a gap time between SRS #2 and SRS #3 may be longer than gap times between SRS #1 and SRS #2 and between SRS #3 and SRS #4 based at least in part on time for the UE 120 to fully power the virtual antenna panels to which SRS #3 and SRS #4 are assigned.

Additionally, or alternatively, the one or more gap times within the time duplexing may be based at least in part on a mapping between the one or more portions of the at least one physical antenna panel and the plurality of virtual antenna panels. In example 600, SRS #1 and SRS #2 may be assigned to virtual antenna panels that are on a first physical antenna panel, and SRS #3 and SRS #4 may be assigned to virtual antenna panels that are on a second physical antenna panel. Accordingly, a gap time between SRS #2 and SRS #3 may be longer than gap times between SRS #1 and SRS #2 and between SRS #3 and SRS #4 based at least in part on the UE 120 using more time to fully power a different physical antenna panel as compared with fully powering a different portion of a same physical antenna panel.

In some aspects, the UE 120 may use more than two gap times. For example, the UE 120 may use a longest gap time (e.g., 100 ms, 50 ms, or so on) between two SRSs mapped to two virtual antenna panels that are included in different physical antenna panels and when a target panel of the two virtual antenna panels is idle or otherwise not fully powered; a medium gap time (e.g., 40 ms, 20 ms, or so on) between two SRSs mapped to two virtual antenna panels that are included in a same physical antenna panel and when a target panel of the two virtual antenna panels is idle or otherwise not fully powered; and a shortest gap time (e.g., 2 ms, 1 ms, or so on) between two SRSs mapped to two virtual antenna panels that are included in a same physical antenna panel and when a target panel of the two virtual antenna panels is active. In another example, the UE 120 may use a longest gap time (e.g., 100 ms, 50 ms, or so on) between two SRSs mapped to two virtual antenna panels that are included in different physical antenna panels and when a target panel of the two virtual antenna panels is in a deep sleep state; a medium gap time (e.g., 40 ms, 20 ms, or so on) between two SRSs mapped to two virtual antenna panels that are included in different physical antenna panels and when a target panel of the two virtual antenna panels is in a light sleep state and also between two SRSs mapped to two virtual antenna panels that are included in a same physical antenna panel and when a target panel of the two virtual antenna panels is in a deep sleep state; and a shortest gap time (e.g., 2 ms, 1 ms, or so on) between two SRSs mapped to two virtual antenna panels that are included in a same physical antenna panel and when a target panel of the two virtual antenna panels is active or in a light sleep state. Additional examples may include four gap times, five gap times, and so on, based at least in part on power statuses of the virtual antenna panels and/or the mapping between the one or more portions of the at least one physical antenna panel and the virtual antenna panels.

As shown in FIG. 6B, the one or more gap times may be same when the virtual antenna panels are active and/or when the virtual antenna panels are on a same physical antenna panel. Accordingly, example 650 includes the same gap time. In some aspects, the UE 120 may use a same gap time for different situations. For example, the UE 120 may use one gap time between two SRSs mapped to two virtual antenna panels that are included in different physical antenna panels and when a target panel of the two virtual antenna panels is active. Moreover, the UE 120 may use the same gap time between two SRSs mapped to two virtual antenna panels that are included in a same physical antenna panels and when a target panel of the two virtual antenna panels is idle or otherwise not fully powered.

In some aspects, the UE 120 may transmit, to the base station, two or more gap times based at least in part on power statuses of the plurality of virtual antenna panels. For example, the UE 120 may report a plurality of gap times, as described above, based at least in part on power statuses of the virtual antenna panels and/or the mapping between the one or more portions of the at least one physical antenna panel and the virtual antenna panels. The UE 120 may use RRC signaling, a MAC-CE, and/or other message to indicate the two or more gap times to the base station 110.

Accordingly, the base station 110 may transmit, and the UE 120 may receive, two or more time-domain resources configurations, corresponding to each of the plurality of reference signal resources, based at least in part on the two or more gap times. For example, the base station 110 may configure different slot offsets, starting positions, and/or other timing parameters based at least in part on the two or more gap times. In some aspects, the base station 110 may transmit (e.g., using RRC signaling or other similar signaling) an SRS-ResourceSet data structure (e.g., as defined in 3GPP specifications or other technical standards), or other similar data structure, indicating the two or more time-domain resources configurations, to the UE 120.

Accordingly, the UE 120 may select from the two or more time-domain resources configurations when transmitting the reference signals (e.g., the SRSs) based at least in part on the power statuses of the plurality of virtual antenna panels (e.g., as described above). In some aspects, the base station 110 may monitor all resources indicated by the two or more time-domain resources configurations such that the power statuses may be inferred based at least in part on which resources the UE 120 uses for transmitting. Additionally, in some aspects, the UE 120 may additionally transmit, and the base station 110 may additionally receive, information indicating the power statuses of the plurality of virtual antenna panels. For example, the UE 120 may transmit a MAC-CE and/or other message to indicate the power statuses to the base station 110. Accordingly, the base station 110 may monitor only a portion of resources indicated by the two or more time-domain resources configurations based at least in part on the information indicating the power statuses of the plurality of virtual antenna panels.

In some aspects, the MAC-CE and/or other message may further indicate gap times associated with powering up the plurality of virtual antenna panels. Accordingly, the base station 110 may determine the two or more time-domain resources configurations based at least in part on the indicated gap times. As an alternative, the base station 110 may transmit, and the UE 120 may receive, one time-domain resource configuration, corresponding to each of the plurality of reference signal resources, based at least in part on the information indicating the power statuses of the plurality of virtual antenna panels and the indicated gap times.

As an alternative, the base station 110 may transmit, and the UE 120 may receive, instructions to reconfigure the power statuses of the plurality of virtual antenna panels. For example, the base station 110 may transmit (e.g., using RRC signaling or other similar signaling) a command to activate one or more virtual antenna panels of the UE 120 and/or deactivate one or more virtual antenna panels of the UE 120. Accordingly, the base station 110 may monitor only a portion of resources indicated by the two or more time-domain resources configurations based at least in part on the instructions to reconfigure the power statuses of the plurality of virtual antenna panels. As an alternative, the base station 110 may transmit, and the UE 120 may receive, one time-domain resource configuration, corresponding to each of the plurality of reference signal resources, based at least in part on the instructions to reconfigure the power statuses of the plurality of virtual antenna panels.

The UE 120 may transmit, to the base station 110 and based at least in part on the time-domain resources configurations, reference signals using the plurality of reference signal resources. For example, the UE 120 may transmit SRSs using the groups of antenna ports included in the virtual antenna panels, and the SRSs may be time duplexed (e.g., TDM'd or otherwise divided in time), as described above.

By using the technique described in connection with FIGS. 6A and 6B, the UE 120 may coordinate with the base station 110 to perform antenna switching when transmitting SRSs. Additionally, the UE 120 may indicate to the base station 110 different gap times between SRSs based at least in part on the power status of virtual antenna panels. Accordingly, the base station 110 may accurately monitor for the SRSs from the UE 120, improving communication quality and reliability (e.g., when the base station 110 configures one or more downlink channels based at least in part on measuring the SRSs).

As indicated above, FIGS. 6A and 6B are provided as examples. Other examples may differ from what is described with respect to FIGS. 6A and 6B.

Figure 7:
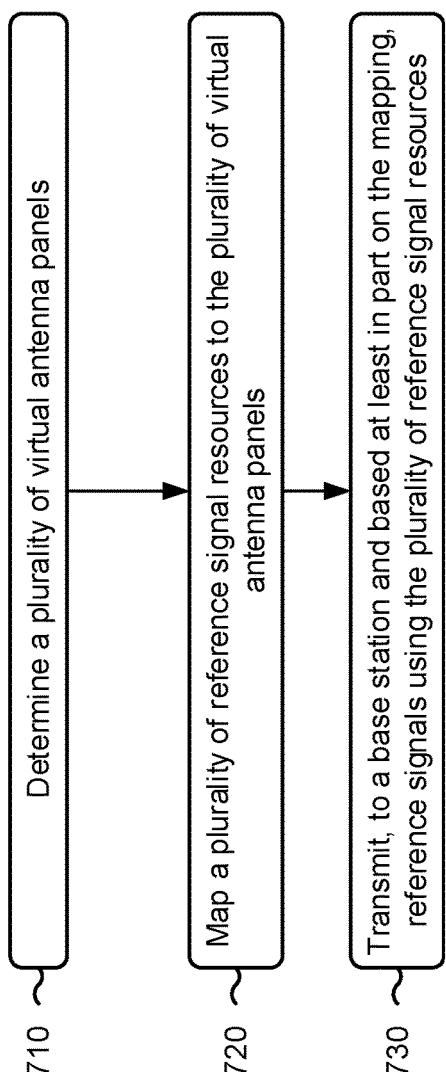
FIGS. 7 and 8 are diagrams illustrating example processes associated with mapping reference signal resources to virtual panels, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or apparatus 900 of FIG. 9) performs operations associated with mapping reference signal resources to virtual panels.

As shown in FIG. 7, in some aspects, process 700 may include determining a plurality of virtual antenna panels (block 710). For example, the UE (e.g., using determination component 908, depicted in FIG. 9) may determine the plurality of virtual antenna panels, as described above. In some aspects, the plurality of virtual antenna panels correspond to a plurality of groups of antenna ports and map to one or more portions of at least one physical antenna panel.

As further shown in FIG. 7, in some aspects, process 700 may include mapping a plurality of reference signal resources to the plurality of virtual antenna panels (block 720). For example, the UE (e.g., using determination component 908) may map the plurality of reference signal resources to the plurality of virtual antenna panels, as described above.

As further shown in FIG. 7, in some aspects, process 700 may include transmitting, to a base station (e.g., base station 110 and/or apparatus 1000 of FIG. 10) and based at least in part on the mapping, reference signals using the plurality of reference signal resources (block 730). For example, the UE (e.g., using transmission component 904, depicted in FIG. 9) may transmit, to the base station and based at least in part on the mapping, the reference signals using the plurality of reference signal resources, as described above.

Process 700 may include additional aspects, such as any single aspect or any combination of aspects described below and/or in connection with one or more other processes described elsewhere herein.

In a first aspect, the groups of antenna ports are configured for simultaneous reception and are not configured for simultaneous transmission.

In a second aspect, alone or in combination with the first aspect, process 700 further includes applying a same spatial-domain transmission filter (e.g., using transmission component 904) when transmitting on the plurality of reference signal resources.

In a third aspect, alone or in combination with one or more of the first and second aspects, process 700 further includes time duplexing the reference signals (e.g., using transmission component 904) that are transmitted on the plurality of reference signal resources.

In a fourth aspect, alone or in combination with one or more of the first through third aspects, one or more gap times within the time duplexing are based at least in part on a power status of a target one of the plurality of virtual antenna panels.

In a fifth aspect, alone or in combination with one or more of the first through fourth aspects, the one or more gap times within the time duplexing are further based at least in part on a mapping between the one or more portions of the at least one physical antenna panel and the plurality of virtual antenna panels.

In a sixth aspect, alone or in combination with one or more of the first through fifth aspects, process 700 further includes transmitting (e.g., using transmission component 904), to the base station, two or more gap times based at least in part on power statuses of the plurality of virtual antenna panels.

In a seventh aspect, alone or in combination with one or more of the first through sixth aspects, process 700 further includes receiving (e.g., using reception component 902, depicted in FIG. 9), from the base station and based at least in part on the two or more gap times, two or more time-domain resources configurations corresponding to each of the plurality of reference signal resources, and the reference signals are transmitted on the plurality of reference signal resources based at least in part on the power statuses of the plurality of virtual antenna panels.

In an eighth aspect, alone or in combination with one or more of the first through seventh aspects, process 700 further includes transmitting (e.g., using transmission component 904), to the base station, information indicating the power statuses of the plurality of virtual antenna panels.

In a ninth aspect, alone or in combination with one or more of the first through eighth aspects, the information further indicates gap times associated with powering up the plurality of virtual antenna panels.

In a tenth aspect, alone or in combination with one or more of the first through ninth aspects, process 700 further includes receiving (e.g., using reception component 902), from the base station, instructions to reconfigure the power statuses of the plurality of virtual antenna panels.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
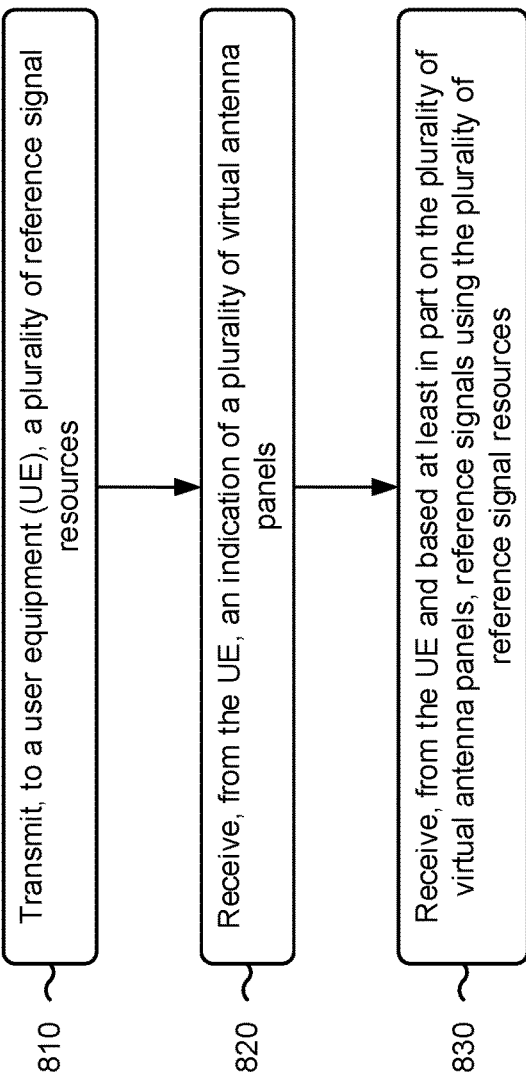

FIG. 8 is a diagram illustrating an example process 800 performed, for example, by a base station, in accordance with various aspects of the present disclosure. Example process 800 is an example where the base station (e.g., base station 110 and/or apparatus 1000 of FIG. 10) performs operations associated with receiving reference signals based at least in part on virtual antenna panels.

As shown in FIG. 8, in some aspects, process 800 may include transmitting, to a UE (e.g., UE 120 and/or apparatus 900 of FIG. 9), an indication of a plurality of reference signal resources (block 810). For example, the base station (e.g., using transmission component 1004, depicted in FIG. 10) may transmit, to the UE, the indication of the plurality of reference signal resources, as described above.

As further shown in FIG. 8, in some aspects, process 800 may include receiving, from the UE, an indication of a plurality of virtual antenna panels (block 820). For example, the base station (e.g., using reception component 1002, depicted in FIG. 10) may receive, from the UE, the indication of the plurality of virtual antenna panels, as described above. In some aspects, the plurality of virtual antenna panels correspond to a plurality of groups of antenna ports and map to one or more portions of at least one physical antenna panel.

As further shown in FIG. 8, in some aspects, process 800 may include receiving, from the UE and based at least in part on the plurality of virtual antenna panels, reference signals using the plurality of reference signal resources (block 830). For example, the base station (e.g., using reception component 1002) may receive, from the UE and based at least in part on the plurality of virtual antenna panels, the reference signals using the plurality of reference signal resources, as described above.

Process 800 may include additional aspects, such as any single aspect or any combination of aspects described below and/or in connection with one or more other processes described elsewhere herein.

In a first aspect, process 800 further includes transmitting (e.g., using transmission component 1004), to the UE, a spatial-domain transmission filter to use on the plurality of reference signal resources.

In a second aspect, alone or in combination with the first aspect, the reference signals that are received on the plurality of reference signal resources are time duplexed.

In a third aspect, alone or in combination with one or more of the first and second aspects, one or more gap times within the time duplexing are based at least in part on a power status of a target one of the plurality of virtual antenna panels.

In a fourth aspect, alone or in combination with one or more of the first through third aspects, the one or more gap times within the time duplexing are further based at least in part on a mapping between the one or more portions of the at least one physical antenna panel and the plurality of virtual antenna panels.

In a fifth aspect, alone or in combination with one or more of the first through fourth aspects, process 800 further includes receiving (e.g., using reception component 1002), from the UE, two or more gap times based at least in part on power statuses of the plurality of virtual antenna panels.

In a sixth aspect, alone or in combination with one or more of the first through fifth aspects, process 800 further includes transmitting (e.g., using transmission component 1004), to the UE and based at least in part on the two or more gap times, two or more time-domain resources configurations corresponding to each of the plurality of reference signal resources, and the reference signals are received on the plurality of reference signal resources based at least in part on the power statuses of the plurality of virtual antenna panels.

In a seventh aspect, alone or in combination with one or more of the first through sixth aspects, process 800 further includes receiving (e.g., using reception component 1002), from the UE, information indicating the power statuses of the plurality of virtual antenna panels.

In an eighth aspect, alone or in combination with one or more of the first through seventh aspects, the information further indicates gap times associated with powering up the plurality of virtual antenna panels.

In a ninth aspect, alone or in combination with one or more of the first through eighth aspects, process 800 further includes transmitting (e.g., using transmission component 1004), to the UE, instructions to reconfigure the power statuses of the plurality of virtual antenna panels.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
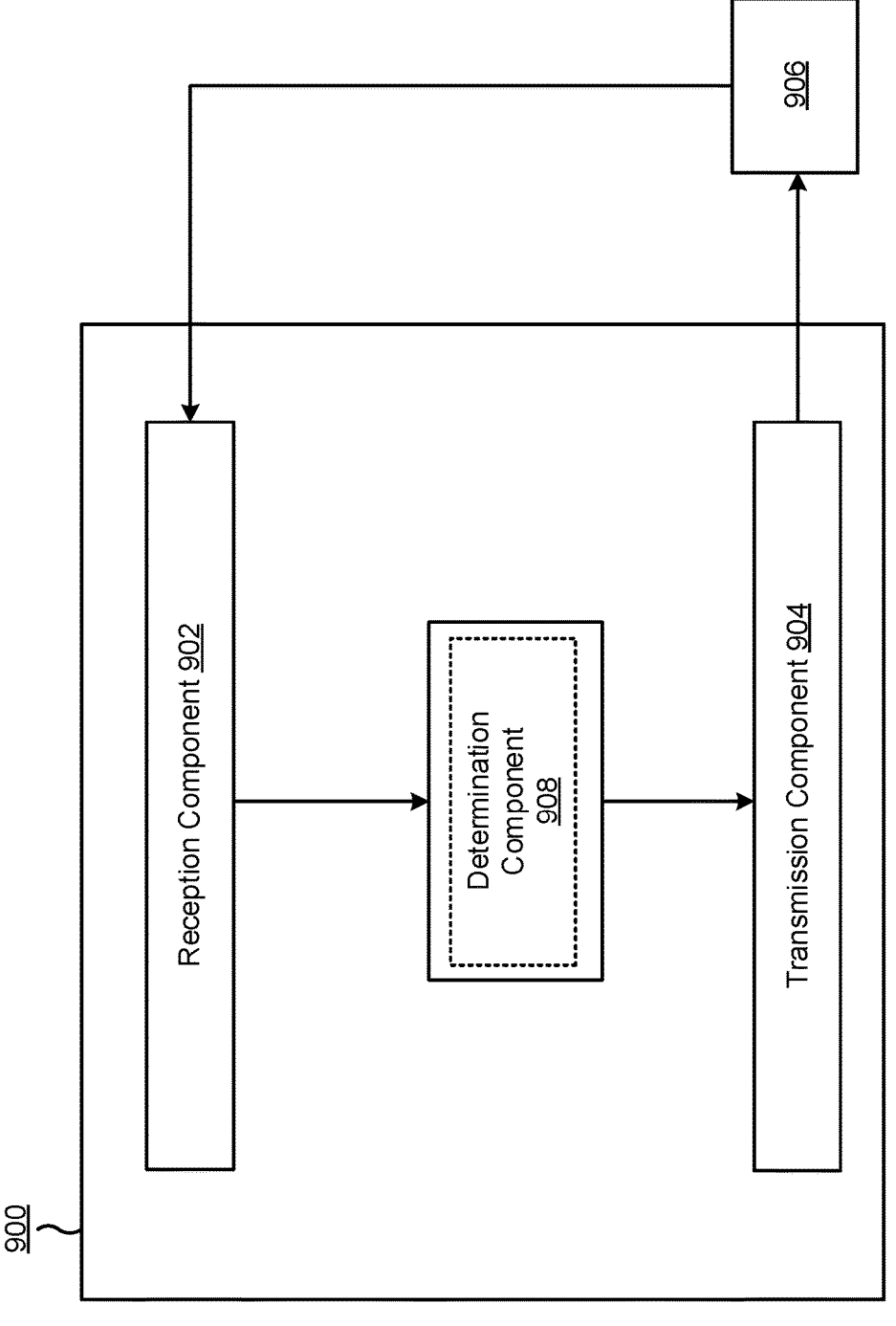
FIGS. 9 and 10 are block diagrams of example apparatuses for wireless communication, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 5-6B. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

In some aspects, the determination component 908 may determine a plurality of virtual antenna panels that correspond to a plurality of groups of antenna ports and that map to one or more portions of at least one physical antenna panel. In some aspects, the determination component 908 may include a transmit MIMO processor, a transmit processor, a controller/processor, a memory, or a combination thereof, of the UE described above in connection with FIG. 2. The determination component 908 may further map a plurality of reference signal resources to the plurality of virtual antenna panels. Accordingly, the transmission component 904 may transmit, to the apparatus 906 and based at least in part on the mapping, reference signals using the plurality of reference signal resources. In some aspects, the transmission component 904 may apply a same spatial-domain transmission filter when transmitting on the plurality of reference signal resources.

In some aspects, the transmission component 904 may additionally transmit, to the apparatus 906, two or more gap times based at least in part on power statuses of the plurality of virtual antenna panels. Moreover, the reception component 902 may receive, from the apparatus 906 and based at least in part on the two or more gap times, two or more time-domain resources configurations corresponding to each of the plurality of reference signal resources. Accordingly, the transmission component 904 may transmit the reference signals on the plurality of reference signal resources based at least in part on the power statuses of the plurality of virtual antenna panels.

Additionally, or alternatively, the transmission component 904 may transmit, to the apparatus 906, information indicating the power statuses of the plurality of virtual antenna panels. As an alternative, the reception component 902 may receive, from the apparatus 906, instructions to reconfigure the power statuses of the plurality of virtual antenna panels.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
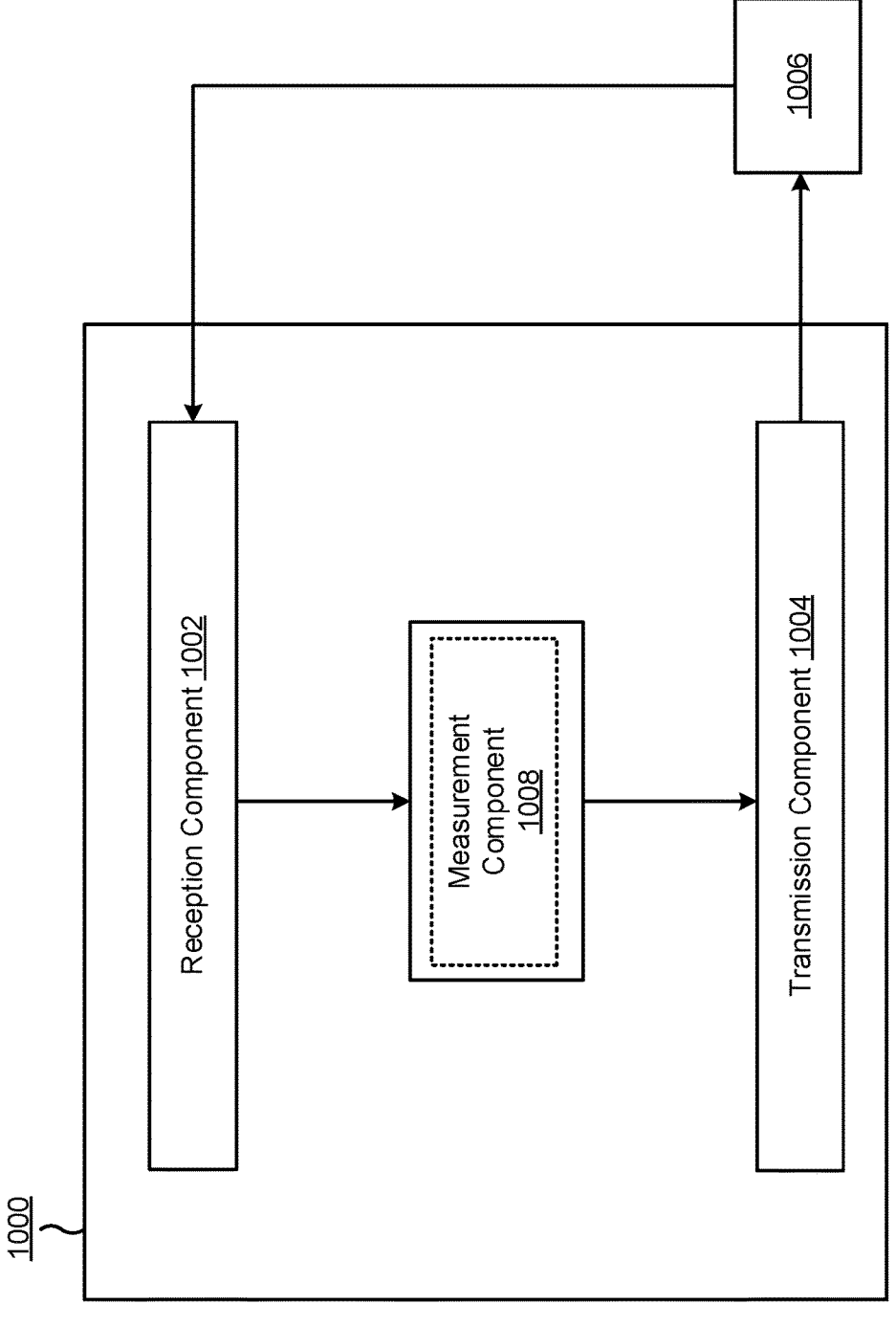

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a measurement component 1008, among other examples.

In some aspects, the apparatus 1000 may be configured to perform one or more operations described herein in connection with FIGS. 5-6B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be collocated with the reception component 1002 in a transceiver.

In some aspects, the transmission component 1004 may transmit, to the apparatus 1006, an indication of a plurality of reference signal resources. Moreover, the reception component 1002 may receive, from the apparatus 1006, an indication of a plurality of virtual antenna panels that correspond to a plurality of groups of antenna ports and that map to one or more portions of at least one physical antenna panel. Accordingly, the reception component 1002 may receive, from the apparatus 1006 and based at least in part on the plurality of virtual antenna panels, reference signals using the plurality of reference signal resources. The measurement component 1008 may measure the reference signals. In some aspects, the measurement component 1008 may include one or more antennas, a demodulator, a MIMO detector, a receive processor, a controller/processor, a memory, or a combination thereof, of the base station described above in connection with FIG. 2. In some aspects, the transmission component 1004 may transmit, to the apparatus 1006, a spatial-domain transmission filter to use on the plurality of reference signal resources.

In some aspects, the reception component 1002 may receive, from the apparatus 1006, two or more gap times based at least in part on power statuses of the plurality of virtual antenna panels. Accordingly, the transmission component 1004 may transmit, to the apparatus 1006 and based at least in part on the two or more gap times, two or more time-domain resources configurations corresponding to each of the plurality of reference signal resources. The reception component 1002 may receive the reference signals on the plurality of reference signal resources based at least in part on the power statuses of the plurality of virtual antenna panels.

Additionally, or alternatively, the reception component 1002 may receive, from the apparatus 1006, information indicating the power statuses of the plurality of virtual antenna panels. As an alternative, the transmission component 1004 may transmit, to the apparatus 1006, instructions to reconfigure the power statuses of the plurality of virtual antenna panels.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors coupled to the memory, the one or more processors configured to:
   determine a plurality of virtual antenna panels, wherein the plurality of virtual antenna panels correspond to a plurality of groups of antenna ports and map to one or more portions of one or more physical antenna panels;
   map a plurality of reference signal resources to the plurality of virtual antenna panels;
   assign a first reference signal of a plurality of reference signals to a first virtual antenna panel of the plurality of virtual antenna panels, and assign a second reference signal of the plurality of reference signals to a second virtual antenna panel of the plurality of virtual antenna panels;
   based on a determination that the first virtual antenna panel and the second virtual antenna panel correspond to a same physical antenna panel of the one or more physical antenna panels, transmit the first reference signal and the second reference signal by time duplexing with a first gap time between the first reference signal and the second reference; and
   based on a determination that the first virtual antenna panel and the second virtual antenna panel correspond to different physical antenna panels of the one or more physical antenna panels, transmit the first reference signal and the second reference signal by time duplexing with a second gap time between the first reference signal and the second reference, wherein the second gap time is larger than the first gap time.

2. The apparatus of claim 1,
   wherein the groups of antenna ports are configured for simultaneous reception and are not configured for simultaneous transmission.

3. The apparatus of claim 1,
   wherein the one or more processors are further configured to:
   apply a same spatial-domain transmission filter to transmit on the plurality of reference signal resources.

4. The apparatus of claim 1,
   wherein a power status of a target one of the plurality of virtual antenna panels is at least based on whether a corresponding physical antenna panel of the one or more physical antenna panels is idle or fully powered.

5. The apparatus of claim 1,
   wherein the first gap time or the second gap time are further based at least in part on a mapping between the one or more portions of the one or more physical antenna panels and the plurality of virtual antenna panels.

6. The apparatus of claim 1,
   wherein the one or more processors are further configured to:
   transmit two or more gap times based at least in part on power statuses of the plurality of virtual antenna panels.

7. The apparatus of claim 6,
   wherein the one or more processors are further configured to:
   receive, based at least in part on the two or more gap times, two or more time-domain resources configurations corresponding to each of the plurality of reference signal resources,
   wherein the plurality of reference signals are transmitted on the plurality of reference signal resources based at least in part on the power statuses of the plurality of virtual antenna panels.

8. The apparatus of claim 7,
   wherein the one or more processors are further configured to:
   transmit information indicating the power statuses of the plurality of virtual antenna panels.

9. The apparatus of claim 8,
   wherein the information further indicates gap times associated with powering up the plurality of virtual antenna panels.

10. The apparatus of claim 7,
    wherein the one or more processors are further configured to:
    receive instructions to reconfigure the power statuses of the plurality of virtual antenna panels.

11. An apparatus for wireless communication at a network node, comprising:
    a memory; and
    one or more processors coupled to the memory, the one or more processors configured to:
    transmit an indication of a plurality of reference signal resources;
    receive an indication of a plurality of virtual antenna panels, wherein the plurality of virtual antenna panels correspond to a plurality of groups of antenna ports and map to one or more portions of one or more physical antenna panels;
    assign a first reference signal of a plurality of reference signals to a first virtual antenna panel of the plurality of virtual antenna panels, and assign a second reference signal of the plurality of reference signals to a second virtual antenna panel of the plurality of virtual antenna panels;
    based on a determination that the first virtual antenna panel and the second virtual antenna panel correspond to a same physical antenna panel of the one or more physical antenna panels, transmit the first reference signal and the second reference signal by time duplexing with a first gap time between the first reference signal and the second reference signal; and
    based on a determination that the first virtual antenna panel and the second virtual antenna panel correspond to different physical antenna panels of the one or more physical antenna panels, transmit the first reference signal and the second reference signal by time duplexing with a second gap time between the first reference signal and the second reference signal, wherein the second gap time is larger than the first gap time.

12. The apparatus of claim 11,
    wherein the one or more processors are further configured to:
    transmit a spatial-domain transmission filter to use on the plurality of reference signal resources.

13. The apparatus of claim 11,
    wherein a power status of a target one of the plurality of virtual antenna panels is at least based on whether a corresponding physical antenna panel of the one or more physical antenna panels is idle or fully powered.

14. The apparatus of claim 11, wherein the first gap time or the second gap time are further based at least in part on a mapping between the one or more portions of the one or more physical antenna panels and the plurality of virtual antenna panels.

15. The apparatus of claim 11, wherein the one or more processors are further configured to:

receive two or more gap times based at least in part on power statuses of the plurality of virtual antenna panels.

16. The apparatus of claim 15, wherein the one or more processors are further configured to:

transmit, based at least in part on the two or more gap times, two or more time-domain resources configurations corresponding to each of the plurality of reference signal resources, wherein the plurality of reference signals are received on the plurality of reference signal resources based at least in part on the power statuses of the plurality of virtual antenna panels.

17. The apparatus of claim 16, wherein the one or more processors are further configured to:

receive information indicating the power statuses of the plurality of virtual antenna panels.

18. A method of wireless communication performed by a user equipment, comprising:

determining a plurality of virtual antenna panels, wherein the plurality of virtual antenna panels correspond to a plurality of groups of antenna ports and map to one or more portions of one or more physical antenna panels;

mapping a plurality of reference signal resources to the plurality of virtual antenna panels;

assigning a first reference signal of a plurality of reference signals to a first virtual antenna panel of the plurality of virtual antenna panels, and assign a second reference signal of the plurality of reference signals to a second virtual antenna panel of the plurality of virtual antenna panels;

based on a determination that the first virtual antenna panel and the second virtual antenna panel correspond to a same physical antenna panel of the one or more physical antenna panels, transmitting the first reference signal and the second reference signal by time duplexing with a first gap time between the first reference signal and the second reference signal; and based on a determination that the first virtual antenna panel and the second virtual antenna panel correspond to different physical antenna panels of the one or more physical antenna panels, transmitting the first reference signal and the second reference signal by time duplexing with a second gap time between the first reference signal and the second reference signal, wherein the second gap time is larger than the first gap time.

19. The apparatus of claim 1, wherein to transmit the plurality of reference signals, the one or more processors are further configured to:

map each reference signal of the plurality of reference signals to a respective virtual antenna panel of the plurality of virtual antenna panels; and time duplex the reference signals across the plurality of virtual antenna panels to transmit only one of the plurality of reference signals at any given point in time.

20. The apparatus of claim 11, wherein to receive the plurality of reference signals, the one or more processors are further configured to:

receive an indication of mapping each reference signal of the plurality of reference signals to a respective virtual antenna panel of the plurality of virtual antenna panels; and receive only one of the plurality of reference signals at any given point in time, wherein the plurality of reference signals are time duplexed across the plurality of virtual antenna panels.

* * * * *